June 4, 1935.  M. SCHNAIER  2,003,612

FROZEN CONFECTION

Original Filed March 26, 1930

INVENTOR
MILTON SCHNAIER
BY
ATTORNEY

Patented June 4, 1935

2,003,612

UNITED STATES PATENT OFFICE 2,003,612

FROZEN CONFECTION

Milton Schnaier, New York, N. Y., assignor to The Popsicle Corporation of the United States, a corporation of Delaware Original application March 26, 1930, Serial No. 438,937. Divided and this application November 10, 1933, Serial No. 697,448

5 Claims. (Cl. 107—19)

My present invention, while capable of a wider field of usefulness, is particularly adapted for embodiment in a frozen confection of the character in which a frozen molded edible body is served to the public with a handle attached thereto, so that the person eating the confection may conveniently hold the handle in his fingers without danger of soiling them. It is further concerned with a method of making such confections and with handle means for them.

The present application is a division of applicant's co-pending application Serial Number 438,937, filed March 26, 1930, relating to improvements in "Frozen confection", now Patent Number 1,972,799, issued September 4, 1934.

This general type of confection is disclosed in prior Patent No. 1,505,592, granted to Frank W. Epperson, and dated August 19, 1924, and preferably consists of a syrupy product frozen about one end of a porous wooden handle stick and bonded thereto by the freezing process. The confection is eaten by sucking the edible material while holding the device by the handle, much in the manner of an ordinary lollipop or all-day sucker.

One object of the present invention is so to associate a handle with the confection that the danger of soiling the fingers while consuming the delicacy is reduced to a minimum.

Another object is to provide a method of freezing confections about a handle stick in such a manner that correct centering of the stick relatively to the frozen body is always assured.

In accordance with one embodiment of the invention the handle means protrudes from both ends of the body so that the latter may be grasped with both hands and eaten like corn on the cob, thereby eliminating the danger of soiling the fingers with drip from the melting body.

In accordance with this method I provide individual molds for the material to be frozen, said molds having integral means to support and center a handle stick prior to pouring in the liquid, so that no independent stick centering means need be applied after filling and before freezing and the danger of freezing the confections asymmetrically about the stick is avoided.

Figure 1:
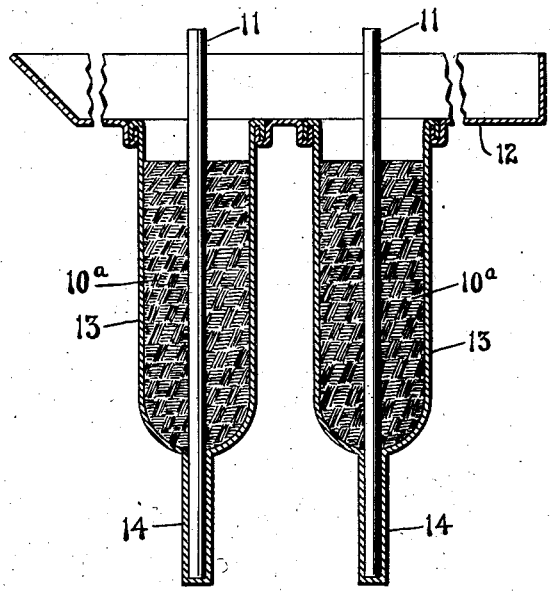
Figure 2:
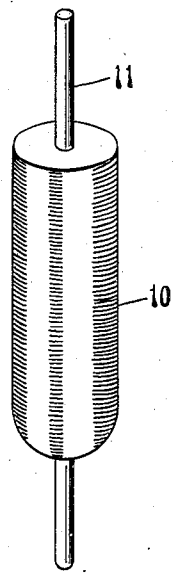

The invention may be more fully understood from the following description in connection with the accompanying drawing, wherein Figure 1 is a sectional detail showing a mold with the stick and syrup therein, preparatory to freezing; and Fig. 2 is a perspective view of the confection after freezing.

Referring first to Fig. 2 of the drawing, I have shown a confection which consists of an elongated body 10 of frozen edible material, such for instance, as a frozen syrup. A handle stick 11 extends through the center of the body 10 and projects from both ends thereof, said stick being frozen to the body.

The nature of the frozen material and the porous nature of the wooden handle stick as well as the general method of carrying out the freezing process, may if desired, be in accordance with the prior patent to Epperson above referred to.

In freezing this type of confection, however, it is desirable to provide a special type of mold in order that the projecting ends of the stick may be kept clear of syrup. With this in view I may form the mold as shown in Figure 1, said mold consisting of an open pan 12 with a plurality of pendant individual mold forms 13 of elongated slightly tapering cylindrical shape, having their mouths affixed by crimping at corresponding openings in the pan. The bottom of each mold 13 is conically tapered toward a central pendant socket like extension or closed bottom well 14 adapted to receive the lower end of a stick 11. These sticks are applied by inserting them into the receiving wells 14 so that they are lightly frictionally held therein and will not float upwardly when the syrup 10a is poured into the molds. The pan 12 serves the function of a funnel into which the syrup may be poured and from which it flows into the various molds around the individual sticks. The molds are placed in a freezing chamber so that the liquid or semi-liquid material becomes frozen and bonded to the sticks. The molds are then removed and slightly heated by dipping them in water to break the frozen bond between the body 10 of the confection and the metal walls of the mold, leaving only the lower ends of the sticks in light frictional contact with the extension 14. The projecting upper ends of the sticks may then be grasped and the confections withdrawn.

Certain features of the freezing process and the freezing mold warrant special comment. One is the effective centering of the sticks and the manner in which they are guided into the receiving wells by the tapering bottoms of the molds. Even if these sticks are short and do not project above the level of the syrup in the mold, the centering action is advantageous and permits the confections to be frozen with the handle end of the stick lowermost instead of uppermost as has previously been the custom.

Another point to be considered is that a very shallow centering well might be employed and the handle end of the stick remain uppermost during freezing. This alone overcomes the need for special stick centering and antiflotation devices.

Inasmuch as the operations of filling the mold with syrup and then freezing occur in rapid succession during normal commercial use of the process, it may be unnecessary for the sticks to frictionally fit the wells. If a stick of slightly less diameter than the well is dropped into place and the somewhat viscous syrup then poured into the mold, a rather effective air blocking action occurs tending to prevent the syrup from flowing into the annular space about the stick. This coupled with the rapid freezing effected shortly after the molds are filled may subtantially preclude wetting the handle stick to an undesirable extent.

When the sticks do not frictionally fit the centering well, the usual process of merely warming and dumping is effective to release the frozen confections from the molds.

The use of a handle stick projecting beyond both ends of the confection permits of the formation of the body in many large ended forms which are not especially practical with a single end of the stick projecting since where only one end of the stick serves as a handle, such unusual shapes are difficult to suck or eat, or at least are not readily consumed with that degree of daintiness usually desirable under the circumstances.

As many changes could be made in the above construction, and many apparently widely different embodiments of this invention could be made without departing from the scope thereof, it is intended that all matter contained in the above description or shown in the accompanying drawing shall be interpreted as illustrative and not in a limiting sense.

Having thus described my invention, what I claim as new and desire to secure by Letters Patent is:

1. A freezing mold of the class described including a pan and individual mold units pendant from the pan, said mold units comprising elongated receptacles having their open mouths affixed at corresponding openings in the pan and closed bottom wells of reduced cross-section extending below the main body portions of said receptacles and adapted to receive the lower end of a handle stick about which material in the main section of the mold is to be frozen.

2. A freezing mold of the class described including a pan and individual mold units pendant from the pan, said mold units comprising elongated receptacles having their open mouths affixed at corresponding openings in the pan and closed bottom wells of reduced cross-section extending below the main body portions of said receptacles and adapted to receive the lower end of a handle stick about which material in the main section of the mold is to be frozen and to center such stick and hold it in upright position.

3. A freezing mold of the class described including a pan and individual mold units pendant from the pan, said mold units comprising elongated receptacles having their open mouths affixed at corresponding openings in the pan and closed bottom wells of reduced cross-section extending below the main body portions of said receptacles and adapted to receive the lower end of a handle stick about which material in the main section of the mold is to be frozen and to center such stick and hold it in upright position, said wells being adapted to frictionally engage and snugly retain the ends of the sticks.

4. A freezing mold of the class described including a pan and individual mold units pendant from the pan, said mold units comprising elongated receptacles having their open mouths affixed at corresponding openings in the pan and closed bottom wells of reduced cross-section extending below the main body portions of said recepacles and adapted to receive the lower end of a handle stick about which material in the main section of the mold is to be frozen, said sticks fitting the wells with such slight clearance as to induce an air blocking action resisting flow of material to be frozen into the wells.

5. A freezing mold of the class described including a pan and individual mold units pendant from the pan, said mold units comprising elongated receptacles having their open mouths affixed at corresponding openings in the pan and closed bottom wells of reduced cross-section extending below the main body portions of said receptacles and adapted to receive the lower end of a handle stick about which material in the main section of the mold is to be frozen, the bottoms of said receptacles tapering to guide the stick end into its well.

MILTON SCHNAIER.